United States Patent [19]

Dickopp et al.

[11] 3,943,274
[45] Mar. 9, 1976

[54] DEMODULATION SYSTEM WITH DROPOUT CORRECTION

[75] Inventors: Gerhard Dickopp; Manfred Pötter; Otto Brehm, all of Berlin, Germany

[73] Assignee: TED Bildplatten Aktiengesellschaft AEG-Telefunken-Teldec, Zug, Switzerland

[22] Filed: Apr. 2, 1973

[21] Appl. No.: 346,889

[30] Foreign Application Priority Data

Apr. 1, 1972 Germany.......................... 2216100

[52] U.S. Cl............ 178/6.6 DC; 360/38; 178/6.6 A
[51] Int. Cl.²......................................... H04N 5/21
[58] Field of Search .................. 178/6.6 DC, 6.6 A; 328/167; 360/38

[56] References Cited
UNITED STATES PATENTS

| | | | |
|---|---|---|---|
| 2,944,107 | 7/1960 | Johnson | 178/6.6 A |
| 3,243,604 | 3/1966 | Johnson | 328/167 |
| 3,309,460 | 3/1967 | Rank | 178/6.6 DC |
| 3,408,457 | 10/1968 | Boylan | 178/6.6 DC |
| 3,461,230 | 8/1969 | Hodge | 178/6.6 DC |
| 3,580,990 | 5/1971 | Numakura | 178/6.6 A |
| 3,629,494 | 12/1971 | Hurst | 178/6.6 DC |
| 3,702,374 | 11/1972 | Numakura | 178/6.6 A |
| 3,717,725 | 2/1973 | Numakura | 178/6.6 A |
| 3,721,773 | 3/1973 | Kluge | 178/6.6 DC |
| 3,727,131 | 4/1973 | Puckette | 328/167 |
| 3,798,364 | 3/1964 | Hayashi | 178/6.6 A |

OTHER PUBLICATIONS

"The High Pass RC Circuit as a Differentiator"; Millman and Taub; p. 38–40; Pulse Digital and Switching Waveforms, 1965, McGraw-Hill, Inc.

Primary Examiner—Bernard Konick
Assistant Examiner—Alan Faber
Attorney, Agent, or Firm—Spencer & Kaye

[57] ABSTRACT

A demodulation system of a playback device for a carrier frequency signal containing both useful information in the zero passages of the signal and signal break-ins which occur in the playback device. The system includes a limiter for limiting in an asymmetrical manner a signal fed to it and a demodulator coupled to the output of the limiter. A highpass filter is connected between the limiter and the demodulator so as to couple the output signal from the limiter to the demodulator. The highpass filter substantially passes only the useful information portion of the carrier signal and suppresses any break-ins introduced into the signal.

7 Claims, 7 Drawing Figures

DEMODULATION SYSTEM WITH DROPOUT CORRECTION

BACKGROUND OF THE INVENTION

The present invention relates to a demodulation system for a playback device in a video system employing a carrier frequency signal containing useful information in the zero passages of the signal, the demodulation system being of the type including a limiter which limits the signal fed to it in a manner which is not completely symmetrical and a demodulator coupled to the output of the limiter.

When a record carrier is scanned by a scanning device to play back video signals, the scanning may occasionally cause the carrier frequency signal, which can be, for example, frequency modulated with the video signals, to be temporarily partially lost, i.e. to experience a "break in", where the amplitude of the useful portion of the signal is temporarily strongly reduced. If such a break in the useful portion of the signal occurs, the electron beam of the picture tube connected to the scanning device will not be properly modulated during this break-in.

This signal break-in will cause a dot or stripe to be produced on the screen of the picture tube which is excessively bright or dark compared to the other sections of the picture on the screen. Such phenomena are extremely annoying for the viewer. Consequently, many efforts have been made to reduce the effect of such signal break-ins to a minimum in order to provide a better television picture.

In one known arrangement for avoiding the effect of such break-ins, the carrier frequency useful signal is divided into two practically identical components, one of these components being delayed with respect to the other component by a time interval which is practically equal to the time required by the electron beam in the picture tube for one horizontal scanning period. Under normal conditions, the undelayed component is used and the delayed component is suppressed. If, however, a device for detecting an error in the signal, e.g. a break-in, actuates a switching device, the undelayed component is suppressed and the delayed component is switched on and is then used during the occurrence of the break-in state. While the above-described arrangement does remove the undesirable effect of the break-ins on the useful signal, such an arrangement, however, requires complicated circuitry which, when used in playback devices, substantially increases the cost of such devices.

In view of the fact that break-ins of the useful signal are a relatively rare occurrence in the presently known playback devices and their time duration is very short, such arrangements which require, in addition to the delay elements for storing the video signal, additional circuitry for detecting the break-ins so that switching from the undelayed to the delayed video signal can be initiated, are relatively complicated and only suitable for playback devices which are intended to meet very high viewer demands.

Since the use of recording and playback video devices as home instruments is increasing, these devices must be able to be fabricated by use of mass production techniques while maintaining a satisfactory level of quality for the device and producing a device which operates in a relatively simple manner.

It was previously the practice, in ultrahigh frequency (UHF) radio receivers with frequency demodulators, to connect, ahead of the demodulator, a limiter having a bandpass filter in the anode circuit of the tube. This limiter, however, was used in a transmission path with a relatively small ratio (about 1/100) of the absolute bandwidth to the maximum frequency and with a relatively interference free useful signal in which signal break-ins rarely occur. Consequently, there was no reason in these known arrangements to eliminate interferences caused by signal break-ins. The resonant circuit in the anode circuit in such arrangements was utilized to serve an entirely different purpose from that to which the present invention relates; such resonant circuits were intended to attenuate the harmonics resulting from the limiting process. In addition, this resonant circuit attentuated low frequency noise which is always present.

SUMMARY OF THE INVENTION

An object of the present invention is to provide a relatively simple demodulation system which will effectively suppress interferences, particularly those interferences occurring in the picture during playback with scanning devices which scan record carriers.

Another object of the present invention is to provide a demodulation system in which signal break-ins in a carrier frequency signal, containing useful information in a playback device are substantially suppressed.

A further object of the present invention is to supplement the demodulation system with its demodulator and series-connected limiter so as to satisfactorily suppress the undesirable results of temporary, strong drops in the amplitudes of the useful signal in order that bright or dark dots or stripes will no longer appear on the screen and to provide a system for accomplishing this objective while maintaining the expenditures at a tenable level.

These objectives are accomplished in the modification of the above-mentioned demodulation system according to the present invention in that a highpass filter is connected in the playback instrument between the limiter and the demodulator. This highpass filter passes only the useful signal, i.e. information portion, of a carrier frequency signal which also contains signal break-ins. Consequently, the signal break-ins are suppressed by the filter.

In another embodiment of the present invention the highpass filter has a frequency limit which lies below, but in the vicinity of, the lowest lower sideband frequencies to be transmitted.

The demodulation system of the present invention preferably includes a delay time demodulator as its demodulator which, although sensitive to shifts in the zero passages of a frequency modulated carrier frequency signal, has other advantages in playback devices containing interferences in the scanned signal and can be easily adapted for this particular purpose. A suitable embodiment of such a demodulator is disclosed in U.S. Patent application Ser. No. 331,352 filed by Gerhard Dickopp on Feb. 12th, 1973, now abandoned, and entitled "Delay Time Demodulator For a Frequency Or Phase Modulated Carrier", and claiming the priority of German Patent Application No. P 2206704. The ratio of the absolute bandwidth of the carrier signal to the maximum frequency of the transmission range is preferably not much less than 1 and may lie, for examaple between 0.5 and 1. The demodulator may be a frequency demodulator and the carrier signal may be frequency modulated. If the frequency modulated signal has a frequency deviation, for example, of about 1 MHz and a center frequency of 3.25 MHz, or a similar relationship, it is favorable for the blocking range, or lower cutoff frequency, of the highpass filter to extend to a limit of 300 to 500 to 1000 kHz.

The demodulation system of the present invention suppresses the results of temporary signal break-ins at that point, i.e., at the output of the limiter, where in previously known systems their damaging influence had been amplified by the demodulation circuitry. Experiments have shown that insufficient limiters in the demodulation system will unavoidably increase the effect of break-ins in the useful signal in a very unfavorable manner. Such limiters unavoidably provide an asymmetrical response and, therefore, result in a different limitation of the positive and negative halfwaves of the useful signal. The useful signal then appears at the output of the limiter with its axis of symmetry shifted with respect to the zero axis by the amount of the asymmetry. A limiter here is called insufficient or incomplete if its limitation of positive and negative halfwaves is asymmetrical.

DESCRIPTION OF THE PREFERRED EMBODIMENTS

Figure 1:
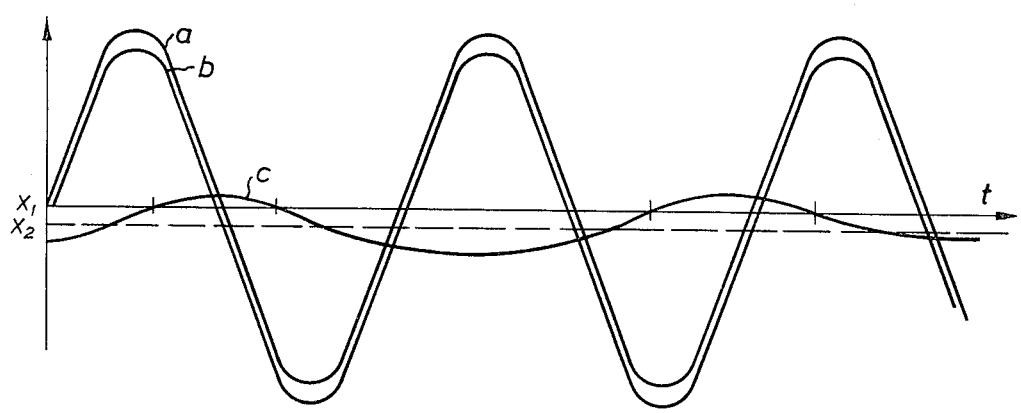
FIG. 1 provides an illustration of various exemplary carrier signal curves helping to describe the demodulation system of the present invention.

FIG. 1 shows various signal curves illustrating the effect of an asymmetrical limiter upon a carrier frequency signal. These signal curves are plotted with respect to time $t$. An uninfluenced useful signal is marked $a$, a useful signal with a shifted zero axis, the broken straight line $x_2$, is marked $b$, and a signal with an amplitude lower than that of the useful signal is marked $c$, which signal is also symmetrical about the axis $x_2$.

From the signal curve $b$, it can be seen how the positive and negative halfwaves of such a useful signal would be limited to different degrees if an incomplete limiter which causes a shift of the zero axis was present in the demodulation system. Such a limiter would limit the signal symmetrically about the interrupted zero axis $x_2$, but not symmetrically with respect to the actual uninterrupted zero axis $x_1$. With such a limiting process, a limited useful signal would result which had the interrupted zero axis $x_2$ and, therefore, the zero passages of the signal about the axis $x_1$ would be shifted with respect to the zero passages of the uninfluenced useful signal $a$. The shift is such that the distances between the zero passages are reduced for the smaller halfwaves while they are increased for the other halfwaves.

In previously known demodulation systems, such an influenced useful signal was fed, along its path, to a demodulator, for example a delay time demodulator, which used the spacing of the zero passages as a criterion for the demodulation. With an uninterfered with useful signal, i.e. a useful signal with no reduction in amplitude, the asymmetry of the limiter will hardly be noticed since the time shift of the zero passages is only slight due to the large, or steep, angle of intersection of the useful signal with respect to the zero axis. When the useful signal has a break-in, i.e. when the amplitude of the signal at the input of the limiter circuit drops considerably, however, this asymmetry will be much more significantly noticeable since there is now a much greater difference between the absolute values at the positive and negative halfwaves of the signal with respect to the unshifted zero axis. For an interference containing signal $c$, whose zero axis has been shifted in the same manner as that of the useful signal $b$, it can be clearly seen that the zero passages with respect to the axis $x_1$ are shifted to form alternatingly significantly shortened and lengthened spaces.

This effect upon the spacing of the zero passages results in pairs of adjacent zero passages which lead to break-ins in the output signal especially when delay time modulators are used, i.e., to an extreme falsification of the demodulated signal.

The shift in the zero axis by the limiter and, consequently, the asymmetrical limiting of the signal and shift in its zero passages take place in synchronization with the occuring break-ins in the useful signal as a result of the undesired amplitude demodulation by the nonideal limiter.

With the inclusion of the highpass filter in the signal path coupled to the output of the limiter, the shift of the zero passages is reversed in part in that the low frequency signal components produced from the asymmetrical limiting, inasmuch as they lie below the intended transmission range of the demodulation device, do not reach the demodulator. Consequently with the inclusion of the highpass filter, the undesired modulation of the electron beam of the picture tube can be prevented.

Figure 2:
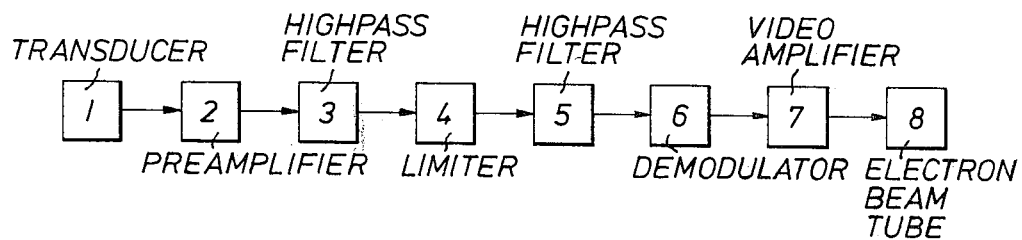
FIG. 2 is a block circuit diagram of an embodiment of a demodulation system according to the present invention.

FIG. 2 is a block circuit diagram of an embodiment of the present invention. The signal path of the useful signals begins in the transducer arrangement 1 marked as the information source, leads through a preamplifier 2, which includes a lowpass filter for the higher harmonics of the transducer signal, as disclosed in U.S. Pat. No. 3,691,317, a highpass filter 3, a limiter 4 and a highpass filter 5 according to the present invention; from the highpass filter 5, the signal goes through a frequency demodulator 6 and a video amplifier 7 to an electron beam tube 8. Details of blocks 1 to 4 and 6 to 8 are known from the video magnetic tape art. The highpass filter 5 according to the present invention may be constructed in accordance with the general knowledge in the filter art and is basically similar to the known highpass filter 3. It is also possible for the transducer arrangement 1 to be a picture record pickup. This type of arrangement of a playback device is especially adaptable to being modified in accordance with the present invention.

Figure 3:
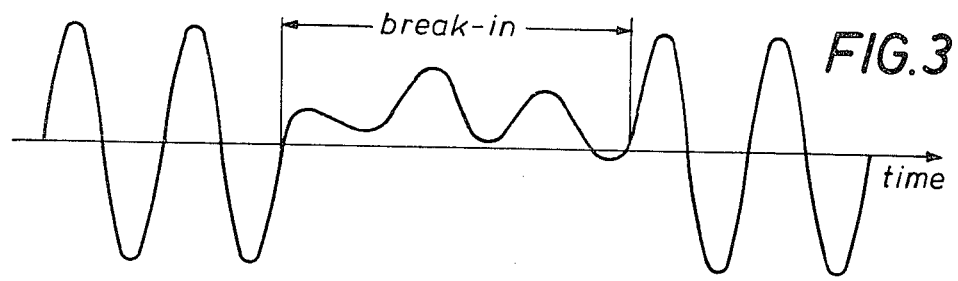
FIGS. 3 to 7 show the waveforms of the output signals from blocks 2 to 6 of FIG. 2 so as to illustrate the processing of a carrier signal with a signal break-in by the demodulation system of the present invention.

The waveform of the output signal of preamplifier 2 shown in FIG. 3 represents a frequency modulated wave having a break-in lasting for a time corresponding to nearly three wavelengths. During this time waves of lower frequencies are superimposed on the useful signal of reduced amplitude. The superposition of waves of lower frequencies can be recognized by the varying shifting of the useful waves relative to the zero axis.

Figure 4:
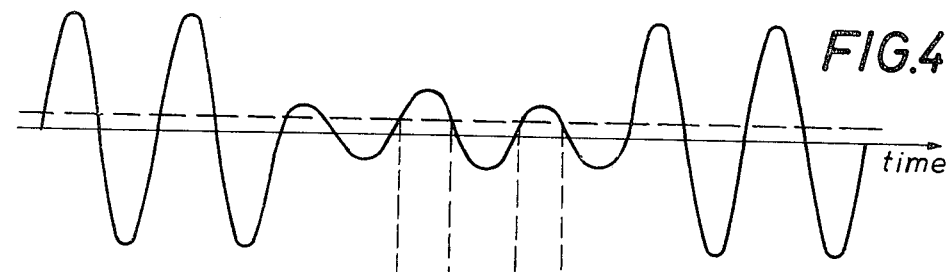

At the output of the highpass filter 3 the superimposed waves of lower frequencies are eliminated as shown in FIG. 4. The result of the elimination is that the amplitudes of the waves during the break-in are nearly symmetrical to the zero axis.

Figure 5:
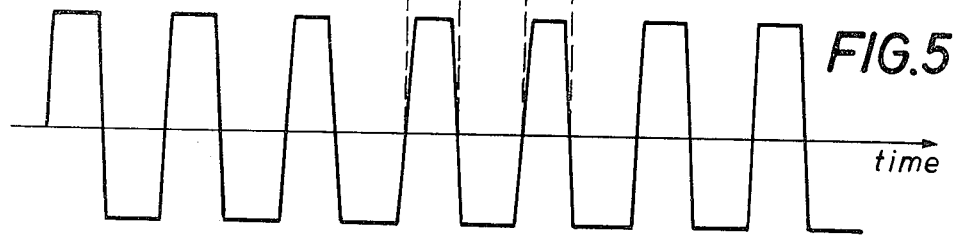

But another undesired effect is inserted now by the inevitable asymmetry of the limiter 4 which does not limit the waves of FIG. 4 symmetrically to the zero axis but to the interrupted line. The effect is the limited waveform of FIG. 5 being at the output of limiter 4. This waveform has a new component of lower frequencies during the original break-in because the pulses of positive polarity are shorter than those of negative polarity.

Figure 6:
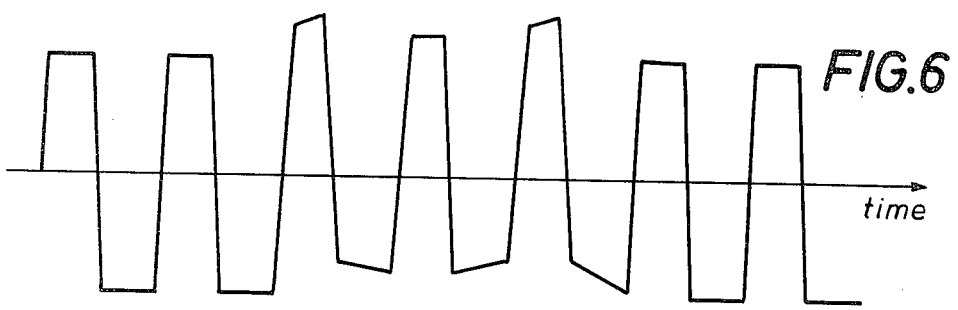

This new component according to the invention is eliminated by the highpass filter 5, the output signal of which is shown in FIG. 6. Here the third, the fourth and the fifth waves are elevated up to positive values in a manner that the integral with respect to time of the positive values of one wave is the same as the integral of the negative values of the same wave. Thus especially a delay time demodulator is capable to produce a demodulated signal which does not differ too much from the signal which would appear if there were no break-in. But, moreover, by the elevation of the third to fifth wave in FIG. 6, adjacent zero passages of the waves have nearly the same distance with respect to each other during the original break-in as they would have without any break-in (though this is dependent on the relation of amplification and limitation level of the limiter). Thus also other demodulators produce a better signal during a break-in than without the highpass filter 5.

Figure 7:
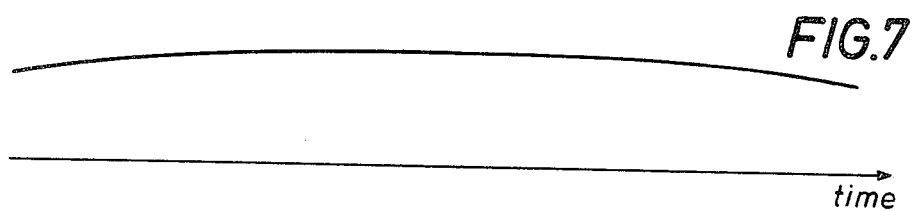

In FIG. 7 the demodulated signal is shown as an example for the output signals of the demodulator 6.

A carrier frequency oscillation which has been, for example, frequency modulated with the video signal is picked up by the transducer arrangement. The deviation range of this modulated signal extends from 2.75 to 3.75 MHz, with the average gray value of the reproduced television picture corresponding to a frequency of 3.4 MHz. With such a carrier signal, the blocking ranges of the highpass filters 3 and 5 may extend to 400 kHz if the video signal to be further processed has a bandwidth of about 3 MHz. If the blocking range of at least the highpass filter 5 is set at higher frequencies then interferences resulting from signal break-ins are even more effectively avoided; the video signal bandwidth, however, is reduced when the above-mentioned deviation range is maintained. The less frequently such signal break-ins occur in the scanned signal, the easier it is to shift the limit of the blocking range toward lower frequencies.

The preferred frequency demodulator is a known delay time demodulator or an improved demodulator as disclosed in the above-cited U.S. Patent application to Dickopp.

In contrast to the UHF radio receivers previously discussed, the present invention utilizes the limiter in a playback device in which the transmission path has a transmission range with a relatively large ratio, only slightly less than 1, of the absolute bandwidth (e.g. 5.5 MHz) to the maximum frequency of the transmission range (e.g. 6 MHz). In such a transmission path, a relatively large number of signal break-ins occur especially in comparison to such UHF receivers. These signal break-ins could cause the amplitude of the useful signal to be reduced by up to 100% thereby causing heavy interference in the output signal of the limiter. Since the limiters never operate completely symmetrically, these interferences in the signal will appear even stronger. Such interferences which are produced by the so-called signal break-ins in the carrier frequency signal which still contain the desired useful information can be prevented by use of the additional highpass filter in the demodulation system in accordance with the present invention.

It can be seen that the highpass filter of the present invention does not serve to attenuate low frequency noise, in contrast to the known resonant circuit in the anode circuit of a limiter tube discussed above; rather this noise and other lower frequency interferences are already attenuated by the highpass filter 3. Highpass filter 5, however, serves the purpose of preventing interferences caused by the signal break-ins which are amplified by the limiter.

It will be understood that the above description of the present invention is susceptible to various modifications, changes and adaptations, and the same are intended to be comprehended within the meaning and range of equivalents of the appended claims.

We claim:

1. In a demodulation system of a playback device for a carrier frequency signal, containing both useful information in the passages thereof through its zero amplitude value and signal break-ins occurring in the playback device, the system including a first highpass filter connected to receive the signal, a limiter for limiting a signal fed thereto in a manner which is not completely symmetrical, said limiter being coupled to the output of said first filter, and a demodulator which uses the spacing between such zero passages as a criterion for demodulation coupled to the output of the limiter, the improvement comprising: a second highpass filter connected between said limiter and said demodulator for coupling signals from said limiter to said demodulator and substantially passing only the useful information portion of the signal and suppressing the signal break-ins, said second filter having a frequency limit in the vicinity of the lowest lower sideband frequency to be transmitted through the demodulation system.

2. An arrangement as defined in claim 1 wherein the demodulator is a delay time demodulator.

3. An arrangement as defined in claim 1, wherein the demodulator is a frequency demodulator and the carrier signal is frequency modulated.

4. An arrangement as defined in claim 1 wherein the ratio of the absolute bandwidth of the carrier signal to the maximum frequency of the transmission range of the demodulation system is only slightly less than 1.

5. An arrangement as defined in claim 1 wherein the ratio of the absolute bandwidth of the carrier signal to the maximum frequency of the transmission range of the demodulation system lies between 0.5 and 1.

6. An arrangement as defined in claim 1 wherein said second highpass filter has a lower cutoff frequency extending to a limit of 500 to 1000 kHz.

7. An arrangement as defined in claim 1 wherein said second highpass filter has a lower cutoff frequency extending to 300 kHz.

* * * * *